United States Patent [19]

Ryder et al.

[11] Patent Number: 4,802,067
[45] Date of Patent: Jan. 31, 1989

[54] HEADLIGHT AIMING AND LEVELING DEVICE

[75] Inventors: Francis E. Ryder; Stephen P. Lisak; Harold L. Purdy, all of Arab, Ala.

[73] Assignees: Ryder International Corp., Aral, Ala.; Textron Inc., Providence, R.I.

[21] Appl. No.: 60,112

[22] Filed: Jun. 9, 1987

[51] Int. Cl.$^4$ .............................................. B60Q 1/00
[52] U.S. Cl. ................................ 362/61; 350/112; 356/249; 33/288; 33/335; 33/379
[58] Field of Search ............... 362/66, 61, 80; 33/288, 33/333, 370, 374, 335, 379, 644, 645, 678; 350/112; 356/249

[56] References Cited

U.S. PATENT DOCUMENTS

| | | | |
|---|---|---|---|
| 1,211,882 | 1/1917 | Schade | 33/385 |
| 1,609,634 | 12/1926 | Ryan | 33/370 |
| 2,058,743 | 10/1936 | Trippe | 33/333 |
| 3,088,216 | 5/1963 | Jesonis | 356/249 |
| 3,612,854 | 10/1971 | Todd et al. | 33/288 |
| 3,694,090 | 9/1972 | Ohyama | 33/379 |

FOREIGN PATENT DOCUMENTS 192688 11/1906 Fed. Rep. of Germany ...... 356/249

OTHER PUBLICATIONS

Drawing "Mini Mount Quad System", undated (2 sheets), Ryder International.

Primary Examiner—Samuel Scott
Assistant Examiner—Noah Kamen
Attorney, Agent, or Firm—Trexler, Bushnell, Giangiorgi & Blackstone, Ltd.

[57] ABSTRACT

A headlamp aiming and leveling device is provided for attachment to an automotive headlamp to facilitate leveling and aiming of the headlamp beam relative to an automotive vehicle upon which the headlamp is installed. The device comprises: a level-indicating device including a housing. At least one, first part of the housing is affixed to a given surface of a headlamp, such that a remaining portion of the housing is movable relative to said affixed part for varying the inclination of the housing in such a fashion as to permit adjustment of the level-indicating device to indicate a level condition. An adjusting arrangement is operatively coupled with the housing at a second part thereof spaced from the part thereof affixed to the headlamp for moving the housing for achieving the level indication while the headlamp is held in a condition wherein the headlamp beam is level. A locking arrangement is provided for locking the adjusting arrangement in the position at which the level condition is indicated. Accordingly, upon installation of the headlamp upon an automotive vehicle, the headlamp may be adjusted until the level-indicating device indicates a level condition, to thereby assure proper leveling and consequent aiming of the headlamp beam.

13 Claims, 4 Drawing Sheets

HEADLIGHT AIMING AND LEVELING DEVICE

BACKGROUND OF THE INVENTION

This invention relates generally to the adjusting of automotive headlamp assemblies, and more particularly to a novel and improved headlamp aiming and leveling device for facilitating the proper aiming of a headlamp beam upon installation of a headlamp to an automotive vehicle, or at any time thereafter.

A number of headlamp adjusting and aiming systems have been proposed for automotive vehicles. Generally speaking, separately mounted sealed beam-type headlamps required independent adjustment utilizing adjusting screws or the like. Other types of headlamp assemblies are now being proposed utilizing unitary housing and lamp assemblies designed to fit aerodynamically styled automotive body contours. Such modern headlamp assemblies may include various automated or semi-automated adjusting mechanisms for adjusting vertical and horizontal positions thereof for aiming the light beam.

However, in either event, there has heretofore been no simple means to assure leveling of the headlamp for a desired level, properly aimed headlamp beam. Rather, it has been necessary to follow a time consuming procedure to achieve the desired headlamp aiming. This procedure requires placing the vehicle on a flat and level surface and utilizing either a special instrument in connection with aiming "bumps" molded into the face of the headlamp, or standardized aiming target. The target is held a predetermined distance and at a predetermined elevation relative to the headlight, and the headlamp is adjusted until the beam strikes the target in a predetermined fashion. As such, it has heretofore been difficult or impossible for the consumer or indeed anyone without access to the proper equipment and information or instructions to achieve the proper headlamp adjustment insofar as the aiming or leveling of the headlamp.

We have proposed to utilize a level or level-indicating device which can be easily installed on the headlamp or headlamp assembly during manufacture of the same and is movable in unison with the headlamp so as to indicate when the headlamp is in a level condition. The level or level-indicating device of our invention is initially movable with respect to the headlamp, such that the headlamp can be factory adjusted to the desired level condition on a test fixture or the like. Next, our novel level device is adjusted relative to the headlamp to indicate a level position or condition thereof.

Thereupon, our device is rigidly fixed relative to the headlamp so that it cannot be further moved or adjusted. Accordingly, the consumer or other installer can thereafter readily level the headlamp relative to a vehicle standing on a level surface by adjusting the pitch or aiming of the headlamp until the level-indicating device once again indicates a level condition. Upon once again achieving the level condition of the level-indicating device, it is assured that the headlamp itself, and more particularly the headlamp beam is once again at the desired level condition.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

DETAILED DESCRIPTION OF THE ILLUSTRATED EMBODIMENT

Referring now to the drawings and initially to FIGS. 1 through 5, a headlight aiming and leveling device designated generally by the reference numeral 20 is illustrated in connection with an exemplary headlamp assembly designated generally by the reference numeral 25. Generally speaking, the headlamp assembly 25 is adjustable about generally vertical and horizontal axes to accomplish desired aiming or leveling of the headlamp beam. In order to accomplish this adjustment or leveling for aiming purposes, respective adjustment assemblies or means 22, 24 may be provided as part of the headlamp assembly.

Figures 1, 2, 3:
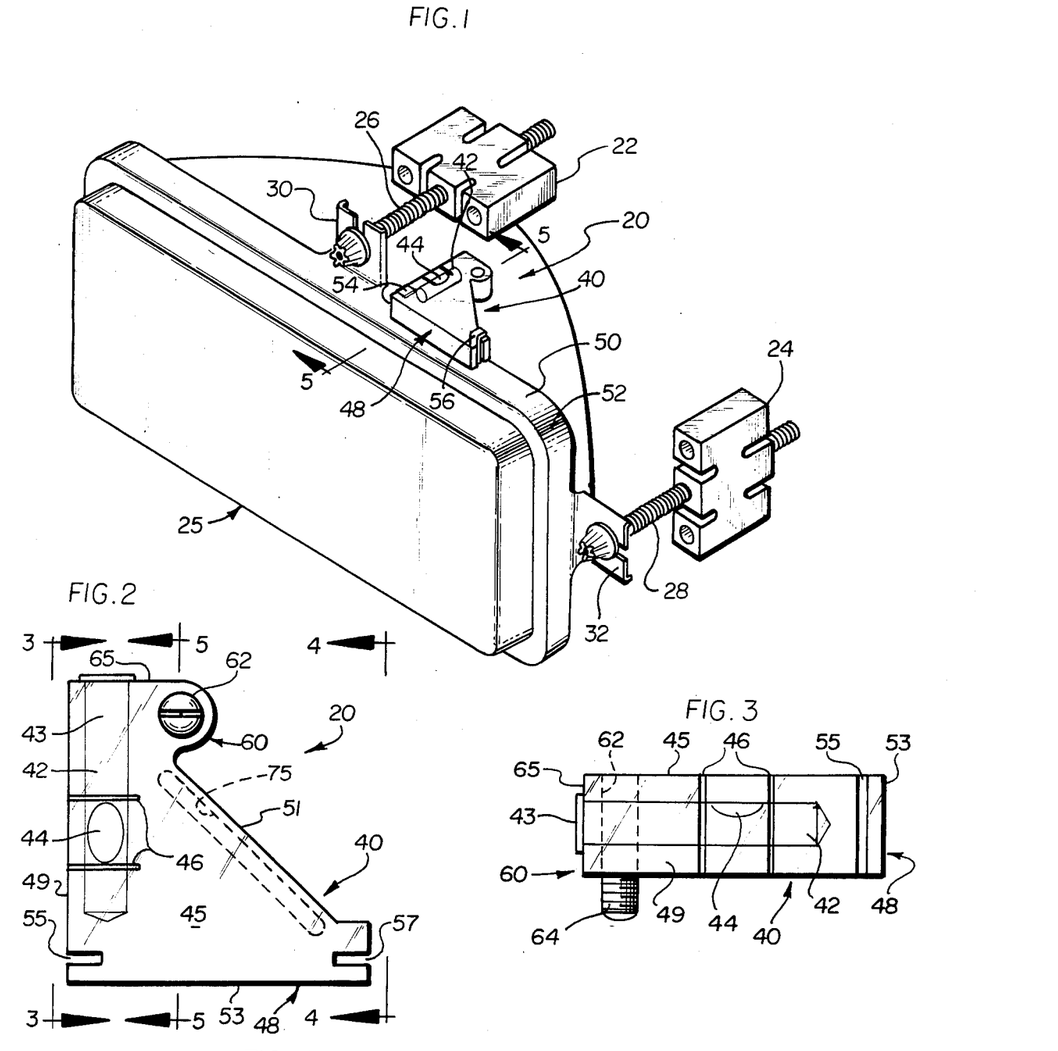
FIG. 1 is a somewhat diagrammatic, perspective view of an adjustable headlamp assembly, which has been provided with a headlight aiming and leveling device in accordance with one aspect of the invention.
FIG. 2 is an enlarged top plan view of our leveling device.
FIGS. 3 and 4 are side elevations taken generally in the planes of the respective lines 3—3 and 4—4 of FIG. 2.
Figure 4:
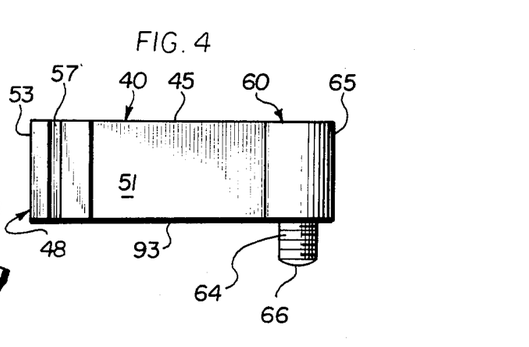
Figure 5:
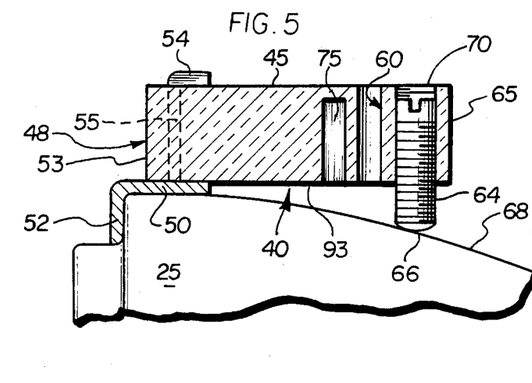
FIG. 5 is an enlarged sectional view taken generally along line 5—5 of FIG. 1.

Briefly, these adjustment members 22 and 24 comprise bracket-like members which are affixedly mounted to a vehicle frame or some other stationary vehicle surface, and elongate threaded advancable and retractable members 26, 28 which are threadably engaged with these brackets. The elongate threaded members 26, 28 engage the headlamp assembly 25 at projecting ears or members 30, 32. It will be appreciated that the foregoing arrangement further requires that the headlamp assembly 25 be mounted in some manner for pivotal motion relative to a frame member or other vehicle surface, however, such a mounting arrangement and the particular adjustment means or assemblies 22, 24 used form no part of the invention and will not be described further herein.

Turning now to the aiming and leveling device 20 in accordance with the invention, this device facilitates the proper leveling and aiming of the headlamp beam when installed upon an automotive vehicle, in accordance with the method of the invention as will be described hereinbelow.

Briefly, the leveling device 20 comprises a level-indicating means including a housing 40. In the illustrated embodiment, housing 40 defines an elongate cavity, bore or chamber 42 for receiving a quantity of fluid having a bubble 44 therein and an end plug 43 to thus define a bubble-type of level device. However, the leveling device 20 may take some other form without departing from the invention. Preferably, level-indicating indicia means includes means 46, such as a pair of spaced parallel lines, which may be etched, printed, or otherwise superimposed on the housing. These indicia 46 are preferably arranged so that upon achieving a level condition of the housing 40, the bubble 44 is disposed exactly between the indicia 46, as illustrated for example in FIGS. 2 and 3.

Accordingly, the housing 40 has at least one transparent surface or portion 45 through which the bore 42 and bubble 44 therein may be viewed against the indicia 46. Hence, the indicia 46 are located on housing 42 on or adjacent the transparent surface 45 and overlying a portion of the elongate cavity or bore 42, as best viewed in FIGS. 2 and 3. These indicia 46 may extend around an adjacent side surface 49 of the housing as well, as shown in FIG. 3, which side surface 49 may also be transparent if desired. In teh illustrated embodiment, the entire housing or body 40 is constructed or formed of a transparent plastic material. However, other materials or constructions may be used without departing from the invention.

Preferably, one part, such as an end portion 48 of the housing 40 is mounted to a selected surface 50 of the headlamp assembly 25. In the illustrated embodiment, the end portion or end part 48 of the housing 40 is shown mounted to a generally horizontally disposed flat, upper surface of a headlamp bezel or rim-like member 52. In the illustrated embodiment, a pair of generally L-shaped spring-like clamp members 54, 56 are clipped at slots 55, 57 to accomplish this mounting. Other means of mounting or affixing the housing 40 to the headlamp assembly 25 may be utilized without departing from the invention. However, the housing 40, in accordance with the invention, may be mounted in other manners, as will be described more fully hereinbelow.

However, this mounting is such that the housing 40 is generally pivotally movable relative to the surface 50 in a bi-directional fashion. The permitted movement is such as to vary the inclination of the bubble-type level 44 defined in the housing, so as to permit adjustment of the level to a level condition in accordance with the indicia 46, as illustrated in FIGS. 2 and 3.

In accordance with the invention, adjusting means 60 are operatively coupled with the housing at a second part 65 thereof which is spaced from the part 48 mounted to the headlamp assembly 25. In the embodiment illustrated in FIGS. 1 through 5 the adjusting means, designated generally by reference numeral 60, take the form of a threaded through bore or aperture 62 in a rear portion 65 of the housing and a complementary externally threaded elongate member 64 engaged with bore 62 and threadedly advancable and retractable, as best viewed in FIG. 5. A downwardly or outwardly projecting end 66 of elongate threaded member 64 abuts a facing surface 68 of the headlamp or headlamp assembly 25 so as to elevate and lower the end 65 of the housing 40, thereby correspondingly elevating and lowering one end of cavity 42 relative to its opposite end so as to cause the bubble 44 to move relative to indicia 46. The bore 62 and member 64 are generally vertically oriented.

In accordance with the method of the invention, the housing is thus appropriately manipulated by the adjusting means 60 until the level indicating means (such as bubble 44 and indicia 46) indicates a level condition thereof. At the same time, the headlamp assembly 25 is held in a condition wherein the headlamp beam is in a known, level condition. That is, the assembly is preferably preassembled with the leveling device 40 at the time of manufacture and/or preassembly of the headlamp assembly 25. The headlamp is placed in a test fixture and energized. A suitable target or other leveling or aiming means is utilized to obtain proper aiming of the headlamp beam relative to the fixture to which it is mounted. When this level condition of the headlamp is reached, the leveling device 40 of the invention is then adjusted as necessary to indicate a level condition. Thereupon, the level indicating device is locked or otherwise affixed in the position of which the level condition is achieved with the headlamp beam being maintained in its known level condition. Accordingly, upon installation of this now "calibrated" or "pre-leveled" headlamp assembly 25 upon an automotive vehicle, the entire headlamp assembly 25 may be adjusted as necessary until the level indicating device (e.g. bubble 44 and indicia 46) again indicates a level condition, which will thereby indicate the proper leveling and consequent aiming of the headlamp beam of the installed headlamp.

In accordance with the invention, means are further provided for locking the level indicating device 40 in its level condition during the preassembly leveling process as just described. This locking means may take the form of a quantity of adhesive 70, for example applied in the bore 62 adjacent elongate threaded member 64, to prevent further relative threaded movement therebetween. Alternatively, the housing 40 may be constructed of a plastic material whereby some physical deformation as by heating or by cold flow deformation may be applied in the area of the bore 62 so as to effectively lock the threaded member 64 in place relative thereto.

In the embodiment of FIGS. 1 through 5, it will be seen that a first end or side part 48 of the housing 40 is mounted to a surface 50 of the headlamp 25 which will be horizontal when in a level condition. The adjusting means 60 is located at a second or opposite end or side part 65 of the housing 40 such that the cavity 42 extends generally transversely between these first and second end or side parts 48, 65. Accordingly, the adjusting means 60 is movable so as to elevate and lower the side part 65 relative to side 48 to thereby correspondingly elevate and lower the end of the cavity 42 adjacent end or side part 65.

In the embodiments illustrated herein, the housing 40 substantially defines, in plan, as best viewed in FIG. 2 for example, a right triangle with the cavity 42 being aligned along an end part 49 thereof which is orthogonal to the end part 48 which is coupled with the headlamp in the embodiment of FIGS. 1 through 5. Accordingly, the adjusting means 60 is located generally adjacent an angle of the right triangle defined by the housing at end part 65, this angle or end being generally opposite the end part 48 mounted to the headlamp as previously described.

Preferably, the rear surface 51 of the triangle thus defined is formed at substantially 45 degrees relative to the respective perpendicular surfaces 49 and 53. Advantageously, this permits the image of the bubble 44 and indicia 46 to be reflected from surface 51 for convenient viewing at surface 53 at the front of the vehicle. This is particularly advantageous in most instances, since other surfaces of the level device 20 may well not be visible when the headlamp and the device are installed in an automotive vehicle. That is, the owner or installer can conveniently carry out the necessary adjustments utilizing the protruding ends of respective threaded adjustment members 26 and 28 with a suitable tool, while viewing the reflection of the bubble and indicia through the front surface 48. In this regard, an additional quantity of reflective material such as foil or the like, may also be applied to the reflecting surface 51, or indeed to either surface of an elongate slot 75 which is provided paralleling this surface 51, and extending into the housing 40, somewhat inside of surface or face 51.

While the preferred embodiments illustrated utilize various forms of adjustment to physically change the inclination of the housing and the bubble-type level defined therein relative to fixed indicia 46, the invention contemplates alternate arrangements as well (not shown). That is, the invention contemplates an arrangement in which the housing may remain fixed during the tilting or leveling (for aiming) of the headlamp. Thereafter, suitable indicia be inscribed or otherwise affixed adjacent the resultant position of the bubble 44 within the core or cavity 42. That is, the "adjustment" made to the level indicating means to indicate a level condition would be made by in effect "preserving" the indication of a level condition of the leveled or adjusted headlamp, with the body of the level device remaining stationary. Thereafter, when installed on an automotive vehicle, the headlamp would be adjusted until this level-indicating means or bubble again reaches this preserved indication or fixed indicia, to thereby assure that the same "level" condition has been reached.

Figures 6, 7, 8, 9, 10:
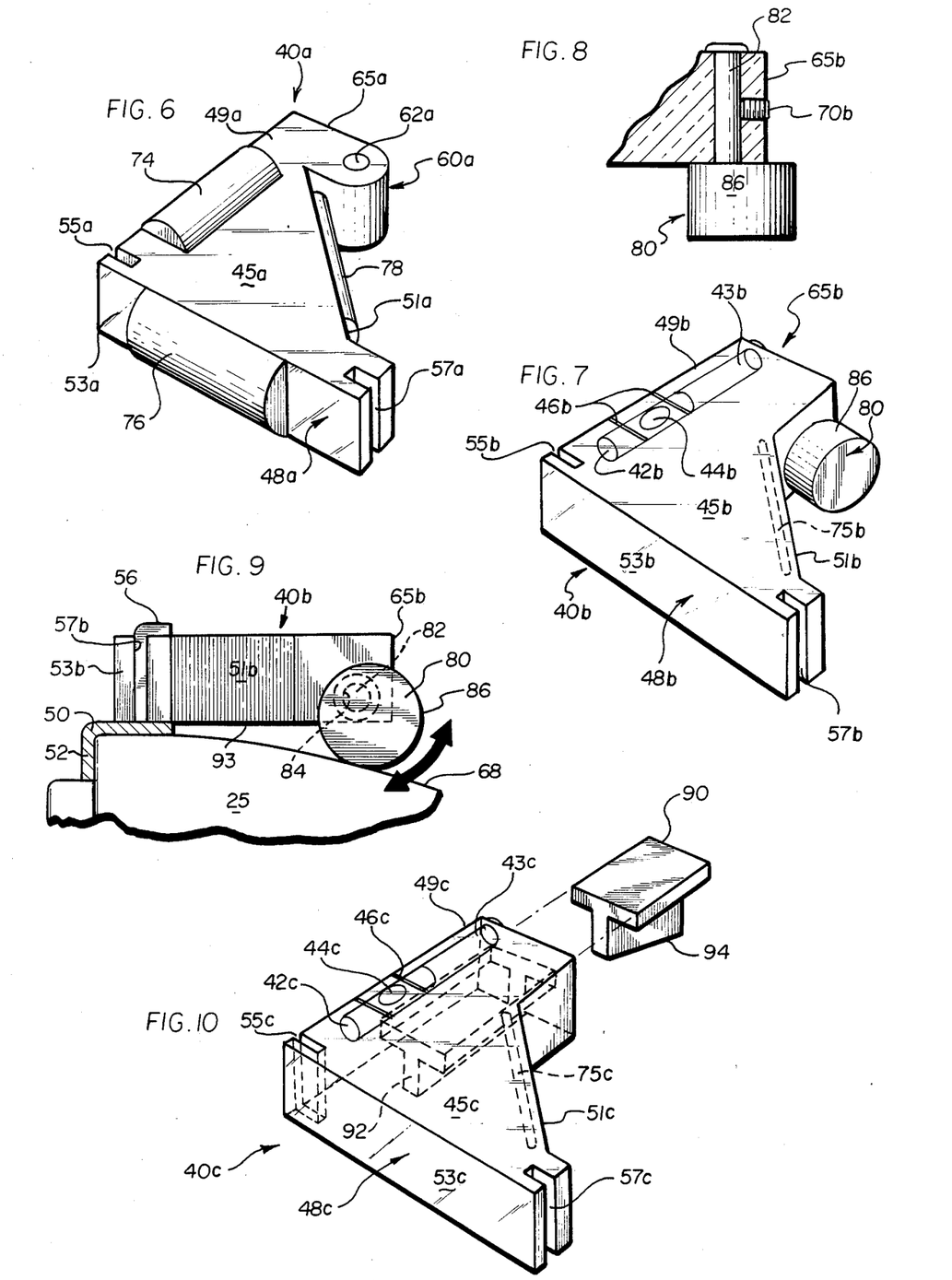
FIG. 6 is a perspective view of a leveling device illustrating further preferred features in accordance with another aspect of the invention.
FIGS. 7, 8 and 9 are perspective, partial sectional and assembled side elevational views of a headlamp aiming and leveling device similar to the device of FIG. 1, but employing an alternate form of adjusting means.
FIGS. 10 and 11 are perspective and assembled sectional elevational views of a further headlamp aiming and leveling device, similar to the device of FIG. 1, but employing yet another alternative form of adjusting arrangement.

Referring now briefly to FIG. 6, in accordance with an alternate form of the invention, the housing 40 is substantially transparent throughout, for example being formed or constructed of a transparent plastic material. In the embodiment of FIG. 6, like reference numerals with suffix a have been utilized to indicate the similar parts of the device 20a. Departing from the embodiment of FIGS. 1 through 5, at least one and preferably two generally convex viewing surfaces 74, 76 have been provided for magnifying the view of the bubble-type level formed in the cavity, bore or chamber 42. A first one 74 of these convex viewing surfaces is located on the transparent surface 45a, such that it overlies and is generally coextensive with the cavity 42. A second one 76 of these convex viewing surfaces is illustrated overlying the surface or side 48a in the embodiment of FIG. 6.

An additional, generally convex reflecting surface 78 may also be formed and located relative to the cavity and viewing surface or surfaces so as to further magnify the image of the bubble and indicia at the viewing surfaces. This convex surface 78 is located, in the embodiment of FIG. 6, generally forms the side defining the hypotenuse of the right triangle generally defined by the housing 40a.

Referring now to FIGS. 7 through 9, an alternative form of adjusting means or mechanism for the level indicating device of the invention is indicated. Accordingly, like parts and components of the device of FIGS. 7 through 9 are indicated by like reference numerals to those previously utilized, together with the suffix b. In the embodiment of FIGS. 7 through 9, an adjusting means 60b comprises a generally cylindrical cam-like member 80 which is rotatably mounted in an off center or eccentric condition to the housing 40b. More particularly, an elongate mounting shaft 82 projects from an off-center location on one axial end surface of the cylindrical member or body 80 and is rotatably mounted in an complementary through bore 84 provided therefore in the housing or body 40b.

In the illustrated embodiment, this through bore 84 extends generally transversely across the rear end or side 65b of the housing. Accordingly, it will be seen that the cam-like member 80 acts upon substantially the same portion or area of the housing 40b as the elongate threaded member which forms the adjusting means of the embodiment of FIGS. 1 through 5. As best viewed in FIG. 9, the cam-like member defines, as it rotates relative to housing 40b, varying degrees of inclination of the housing 40b and of cavity 42b and bubble-type level defined therein. That is, a generally cylindrical peripheral surface 86 of cam member or body 80 abuts the facing surface 68 of headlamp or headlamp assembly 25 in much the same fashion as the abutment surface 66 of member 64 described above with reference to FIGS. 1 through 5, to thereby define generally vertical raising and lowering of the adjacent end 65b of the housing 40b.

Figures 11, 12, 13, 14:
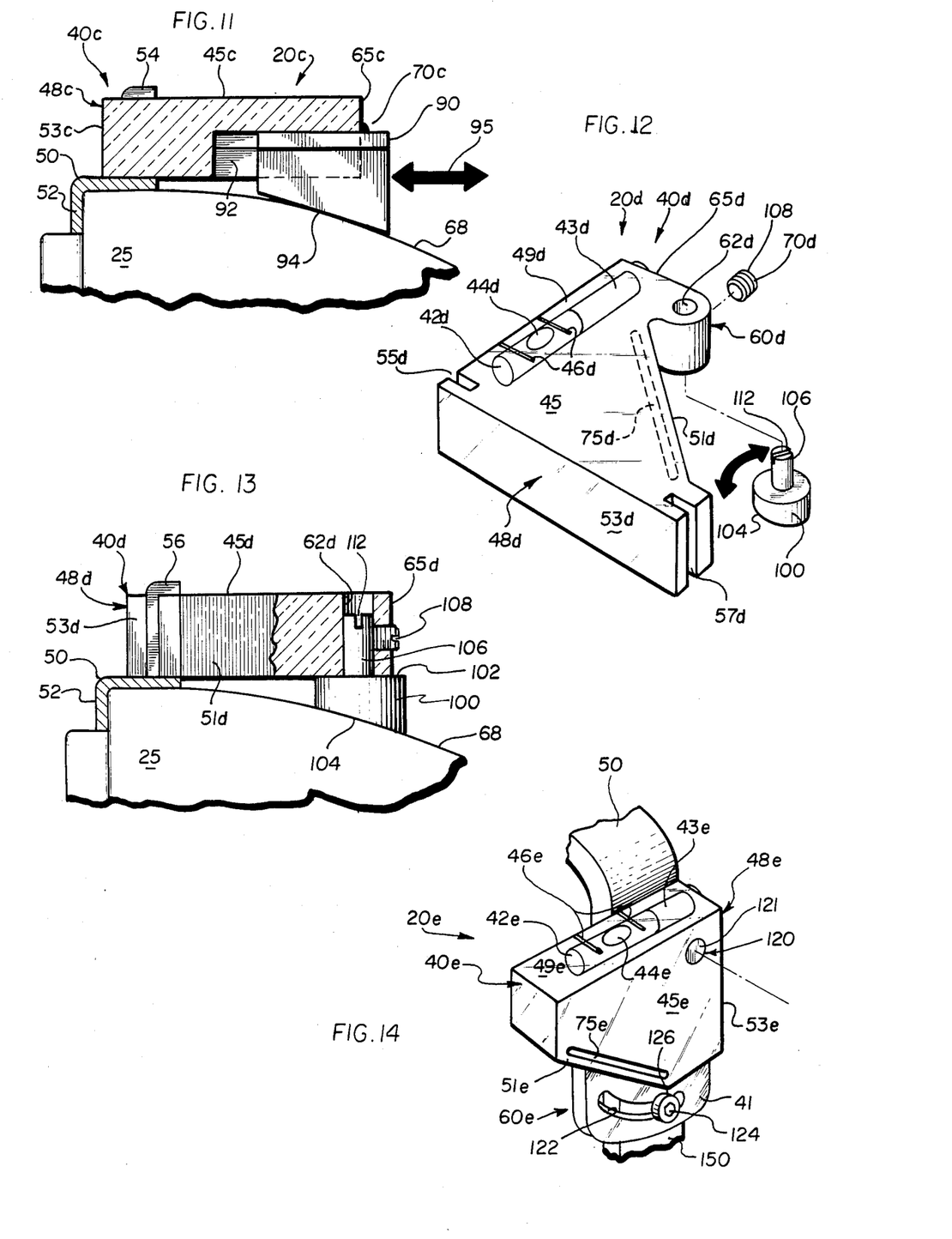
FIGS. 12 and 13 are perspective and assembled sectional elevational views of a further headlamp aiming and leveling device, similar to the device of FIG. 1, but employing yet another alternative form of adjusting arrangement.
FIG. 14 is a partial perspective view showing an alternate arrangement for mounting or leveling device to a headlamp.

Referring now to FIGS. 10 and 11, in accordance with yet another embodiment of the invention, adjusting means 60c comprises an elongate member 90, which interfits in a key-like fashion with a complementary-shape slot 92 in the body of housing 40c. In this regard, like parts and elements of the embodiment shown in FIGS. 10 and 11 are designated by like reference numerals together with the suffix c. More specifically, elongate member 90 has a tapered surface portion 94 which is oriented or located for engagement with facing headlamp surface 68. This tapered surface portion 94 forms a bottom or undersurface of the generally T-shaped member 90 which interfits in key-like fashion in a complementary generally T-shaped elongate keyhole-like slot or opening 92, which is open at undersurface 93 of the housing, and extends into the body of housing 40c.

The T-shaped adjustment member 90 is formed such that the tapered or inclined surface 94 goes from an effective height at least as large as the depth of receiving keyhole-like slot 92 to a considerably larger effective height. Accordingly, by sliding the T-shaped adjustment member 90 varying degrees inwardly and outwardly relative to slot 92, as indicated in FIG. 11 by arrows 95, the tapered surface will engage facing headlamp surface 68 in such a manner as to hold the end 65c of the housing 40c at varying vertical heights relative to surface 68. This in turn will correspondingly vary the inclination of the bubble level-defining chamber 42c. It should be noted that the generally T-shaped keyhole-like slot 92 opens at end part 65c of the housing to receive adjustment member 90, and this end 65c is generally opposite the end part 48c which is coupled to the headlamp assembly or bezel 50.

Reference is next directed to FIGS. 12 and 13 wherein yet a further alternate form of adjusting means is illustrated. As with the previous embodiments, similar parts and components are indicated by like reference numerals with suffix d. In the embodiment of FIGS. 12 and 13, adjusting means 60d comprises a generally circular cam-like body 100 with respective oppositely facing surfaces 102, 104. The latter surface 104 is inclined relative to generally flat surface 102. Surface 102 generally abuts the underside or surface 93 of the body or housing 40d while surface 104 abuts facing headlamp surface 68. A generally vertically extending shaft 106 projects or extends orthogonally from surface 102 and is preferably generally centered with respect thereto. A generally vertically extending through bore or aperture 62d is formed adjacent end or surface 65d of the housing 40d to receive this shaft member 106.

Similarly to the embodiment of FIGS. 1 through 5, the bore 62b may be internally threaded to also receive an externally threaded shaft 106. A set screw 110 may be provided in the same manner indicated in FIG. 8. In either event, suitable tool-receiving means such as transverse slots 110, 112 are formed in the respective end portions of shaft 106 and set screw member 108 for engagement with a suitable tool such as a screwdriver blade or the like, for rotating the same. It will be appreciated that upon rotation of shaft 106 and setting of set screw 108, a varying effective height of the body 100 will be interposed intermediate the housing 40d and surface 68, thereby achieving a corresponding variation in the inclination of bubble level-defining chamber 42d.

Referring to FIG. 14, as previously indicated, the device of the invention may be mounted to other surfaces of the headlamp assembly of housing as well. In FIG. 14, a further alternate form of level indicating device 40e is illustrated mounted to a generally vertically disposed surface 150 of headlamp assembly 25 and specifically of bezel or frame component 50 thereof. As with the previous embodiment, similar parts and components of the device shown in FIG. 14 are indicated herein by similar reference numerals together with the suffix e. Departing from the prior embodiments, the body or housing 40e is pivotally or rotatably mounted relative to surface 150 by means of cooperating pivot pin means 120 and bearing means 121. In this regard the respective pivot pin and bearing may be alternatively formed on one or the other of surface 150 and housing or body 40e so as to define a desired pivotal or rotatable mounting of the latter with respect to the former.

The adjusting means 60e comprises an elongate, generally arcuate through slot or opening 122 in an extension 41 the housing or body 40e and a pin 124 riding in this slot 122 so as to generally guide and limit the pivotal motion of the body 40e about pivot pin bearing means 120. The pin 124 preferably projects entirely through slot 122 and into the surface 150, to which it is affixed by suitable means. Accordingly, upon achieving the desired inclination or level condition of level indicating device 20e, the pin 124 is locked relative to slot 122 by suitable means. As in the prior embodiments, such locking means may include a quantity of adhesive, or a slight deformation of the materials of either the slot 122 or the pin 124 or both so as to achieve a locked condition therebetween. Moreover, the end of pin 124 which engages surface 150 may be threaded to engage a complementary threaded opening in surface 150, whereby pin 124 may be advanced relative to surface 150. An enlarged head 126 of pin 124 may be utilized to alternately generally release and lock the pin relative to slot 122 to first permit movement to achieve the desired level condition of device 40e and thereafter to effect the locking or holding thereof in this condition.

In this latter regard it will be noted that some locking means similar to means 70 (see FIG. 5) for holding the adjusting means in a locked or inoperative condition following the desired adjustment of the leveling device, are utilized or provided in each of the embodiments heretofore described. However, in the embodiment of FIGS. 7 through 9, as particularly indicated in FIG. 8, this locking means 70b may take the form of a set screw which runs into end 65b of housing 41b generally transversely to shaft 82 so as to lockingly abut against the same.

Figure 15:
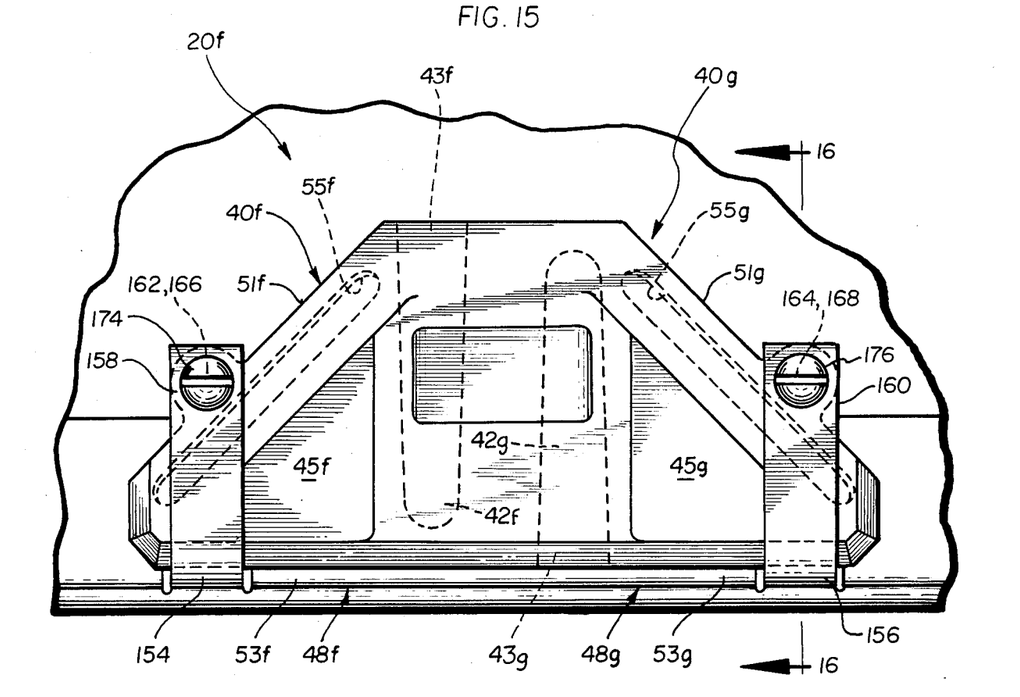
FIG. 15 is a top plan view of a double level arrangement in accordance with another form of the invention.
Figure 16:
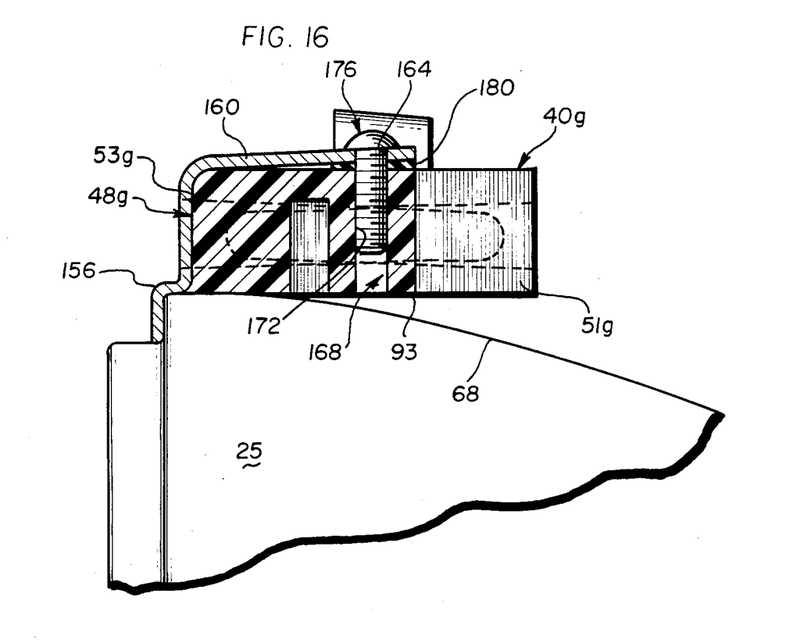
FIG. 16 is a sectional view taken generally along the line 16—16 of FIG. 15.

Referring now to FIGS. 15 and 16, we also contemplate utilizing a "double" version of the leveling device herein illustrated and described, in order to obtain a somewhat increased accuracy and resolution of the "level" indication. It is contemplated that such a "double" device would consist essentially of two devices 20f, 20g with the bubble-type level portions formed as a unitary piece, such that the respective chambers 42f, 42g are aligned in parallel, side-by-side condition, as indicated in FIG. 15. The effect of this "double bubble" system would be to give the equivalent of a much longer bubble-type level, while remaining within the limited depth of the space available relative to the headlamp as illustrated in FIG. 1. An adjustment arrangement and locking arrangement for this double level device of FIG. 15 is also indicated in FIG. 16.

In the preferred embodiment illustrated in FIG. 15, the two bores 42f, 42g are initially formed in the level body 40f, 40g from opposite sides to greatly simplify the process of integrally molding the same in a single operation from a moldable plastics material. Preferably, the bores have rounded ends and are tapered to somewhat smaller diameters from their enlarged diameter outer openings to suggest a "bullet" shape. This shape facilitates the molding of the same by providing easily removable pins in a mold, which pins extend inwardly from opposite sides of the mold. The taper of the bores has been exaggerated somewhat in the drawings.

Referring now also to FIG. 16, the adjustment means or arrangement contemplates extending upper surfaces of brackets or clips 154, 156 which mount the level device to the headlamp housing somewhat. Accordingly, respective rearwardly extending portions 158, 160 of these brackets are provided with through apertures 162, 164, alignable with respective recieving bores 166, 168 at either side of the "double" housing. Preferably the receiving bores have internal threads 170, 172 for receiving a complementary threaded fastener 174, 176, preferably a screw with an enlarged head, therethrough. A rubber or other resilient spacer member 178, 180 is inserted intermediate these bores and the rearwardly extending portion of the mounting bracket, and preferably is in the form of a washer- or grommet-like member surrounding the threaded body of the adjustment screw.

Accordingly, it will be seen that the foregoing permits some degree of adjustment of the angle of the housing relative to the mounting bracket and hence also relative to the headlamp assembly. Advantageously, the resilient nature of the rubber or other resilient or elastic spacer or washer permits the desired range of adjustment while holding the assembly substantially in the position achieved, once a desired adjustment has been reached by rotation of the adjustment screw. In all other respects, the configuration of each "half" of the "double" level arrangement is substantially similar to that indicated above with reference to FIGS. 1-5, such that the respective level portions may be conveniently viewed reflected through the front viewing surfaces thereof. As mention hereinabove, additional reflective material may be interposed in the slots a desired to further enhance the viewing of the reflected image. These like parts and components are indicated in FIGS. 15 and 16 by like reference numerals, with suffixes f and g.

While particular embodiments of the invention have been shown and described, it will be obvious to those skilled in the art that changes and modifications of the present invention, in its various aspects, may be made without departing from the invention in its broader aspects, some of which changes and modifications being matters of routing engineering or design, and others being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. A headlight aiming and leveling device for attachment to an automotive headlamp to facilitate leveling and aiming of the headlamp beam relative to an automotive vehicle upon which the headlamp is installed, said device comprising: level-indicating means including a housing; means for mounting at least one, first part of said housing to a given surface of said headlamp, such that said housing is movable for varying the inclination of the housing in such fashion as to permit adjustment of the level indicating means to indicate a level condition; adjusting means operatively coupled with said housing at a second part thereof spaced from said part hereof affixed to said headlamp for producing movement of said housing for achieving said indication of a level condition by said level-indicating means while the headlamp is held in a condition wherein the headlamp beam is level; and locking means for locking said adjusting means in the position at which said indication of a level condition is achieved; whereby, upon installation of said headlamp upon an automotive vehicle, said headlamp may be adjusted until said level-indication means again indicates said level condition, to thereby assure proper leveling and consequent aiming of the headlamp beam; wherein said housing has at least two sides formed at an angle such that it substantially defines, in plan, a triangle, said level-indicating means being aligned along a first side thereof, and wherein a further side of the housing is angled relative to the first side to form a reflective surface for permitting viewing of a reflected image of the level-indicating means from a location other than said first side.

2. The device of claim 1 wherein said housing has at least one transparent surface portion, an elongate cavity generally aligned for viewing through said transparent surface portion for receiving a quantity of fluid having a bubble therein to define a bubble-type level, and level-indicating indicia means on said housing adjacent said transparent surface portion and overlaying a portion of said cavity; said cavity being so aligned with respect to the housing that said adjusting means will operate so as to generally elevate and lower one end of said cavity an amount necessary to cause the bubble of said level to come into registry with said indicia.

3. A device according to claim 2 wherein said housing has at least one generally convex viewing surface in registry with said bubble-type level and indicia for generally magnifying the same to facilitate viewing thereof.

4. The device according to claim 3 wherein said housing is substantially transparent throughout and has a generally convex reflecting surface located relative to said cavity and said viewing surface for further magnifying the image of the cavity and indicia at said viewing surface.

5. The device of claim 1 wherein said means for mounting said part of said level to said headlamp comprises means for mounting a first side of said housing to a surface of said headlamp housing which is horizontal when in a level condition and wherein said adjusting means is located at an end of said housing spaced apart from said first side, and wherein said level-indicating means comprises a bubble-type level including an elongate cavity extending generally transversely between said first side and said end, and wherein said adjusting means is movable to generally elevate and lower said end of said housing relative to said first side to thereby correspondingly elevate and lower an adjacent end of said cavity.

6. A device according to claim 1 wherein said adjusting means comprises an elongate threaded member having an abutment surface at one end thereof for abutting a facing surface of said headlamp and a driver head at an opposite, accessible end thereof, and a through generally vertical aperture formed in said housing adjacent an end thereof and having a complementary thread therein for receiving said elongate member therethrough and for threadably advancing and retracting said elongate member in a generally vertical direction to achieve a corresponding inclination of said housing.

7. A device according to claim 1 wherein said adjusting means comprises a cam-like member rotatably mounted in an eccentric condition to said housing for rotation in a generally vertical plane and for abutment with a facing headlamp surface to thereby define varying degrees of vertical inclination of said housing.

8. A device according to claim 1 wherein said adjusting means comprises an elongate member having a tapered surface portion oriented for engagement with a generally facing headlamp surface, and a complementary elongate slot extending into said housing for receiving said elongate member inserted therewithin the varying extents, such that an outermost end of said tapered surface extends a controllable amount vertically below said housing to engage said headlamp facing surface to thereby define the inclination of said housing.

9. A device according to claim 1 wherein said adjusting means comprises a body having oppositely facing surfaces, one of said surfaces being flat and the other being inclined relative to said flat surface, and a generally vertically extending shaft extending orthogonally said first, flat surface for rotatably mounting the same abutting an undersurface of said housing, such that said inclined surface of adjusting member abuts a facing headlamp surface, such that upon rotation of said shaft, the inclination of the housing is adjustable in accordance with the effective height of said body engaged between the respective housing undersurface and facing headlamp surface.

10. Apparatus according to claim 1 wherein said locking means comprises means for deforming at least one of engaged portions of the adjusting means and the housing so as to hold the adjusting means in a non-movable condition relative to the housing, upon achieving the desired adjustment thereof.

11. A device according to claim 1 wherein said housing part affixed to said headlamp comprises cooperating pivot pin means and bearing means for pivotally mounting said housing relative to said headlamp, and wherein said adjusting means comprises means operatively engaged with said housing at a part thereof spaced from said pivot pin means and bearing means, and said level-indicating means being adjustable so as to indicate a level condition in response to manipulation of the adjusting means to achieve pivotal motion of the housing relative to the headlamp.

12. A device according to claim 11 wherein respective aligned surfaces of the housing and the headlamp include respectively an elongate, generally arcuate slot spaced from said pivot means and bearing means, and a projecting pin riding in said slot, to generally guide and limit the pivotal motion thereof, and wherein said locking means includes means for locking said pin relative to the slot so as to non-pivotally affix the housing relative to the headlamp upon achieving the desired level condition thereof.

13. A headlight aiming and leveling device for attachment to an automotive headlamp to facilitate leveling and aiming of the headlamp beam relative to an automotive vehicle upon which the headlamp is installed, said device comprising: level-indicating means including a housing; means for mounting at least one, first part of said housing to a given surface of said headlamp, such that upon varying the inclination of the housing adjustment may be made to the level indicating means to indicate a level condition; and means for preserving said indication of a level condition; whereby, upon installation of said headlamp upon an automotive vehicle, said headlamp may be adjusted until said level-indicating means again reaches the preserved indication of a level condition, to thereby assure proper leveling and consequent aiming of the headlamp beam; and wherein said housing substantially defines, in plan, a right triangle, said level-indicating means being aligned along a first side thereof, and a second side thereof, orthogonal to the first side, being coupled to said headlamp horizontal surface, and wherein a third side of the housing is angled to form a reflective surface for permitting viewing of a reflected image of the level-indicating means from the said second side.

* * * * *